US012737176B2

(12) United States Patent
Zhao et al.

(10) Patent No.: US 12,737,176 B2
(45) Date of Patent: Sep. 15, 2026

(54) PROGRAM DATA PACKAGE GENERATION METHOD, DEVICE AND STORAGE MEDIUM

(71) Applicant: BOE TECHNOLOGY GROUP CO., LTD., Beijing (CN)

(72) Inventors: Zhenyan Zhao, Beijing (CN); Zhe Zhang, Beijing (CN); Naifu Wu, Beijing (CN); Chu Chu, Beijing (CN); Yu Shi, Beijing (CN); Hongxiang Shen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 478 days.

(21) Appl. No.: 17/916,258

(22) PCT Filed: Mar. 30, 2021

(86) PCT No.: PCT/CN2021/084159

§ 371 (c)(1),
(2) Date: Sep. 30, 2022

(87) PCT Pub. No.: WO2022/205013

PCT Pub. Date: Oct. 6, 2022

(65) Prior Publication Data

US 2024/0419438 A1 Dec. 19, 2024

(51) Int. Cl.
*G06F 8/71* (2018.01)

(52) U.S. Cl.
CPC .................................... *G06F 8/71* (2013.01)

(58) Field of Classification Search
CPC ..... G06F 8/71; G06F 8/20; G06F 8/30; G06F 8/36
See application file for complete search history.

(56) References Cited

U.S. PATENT DOCUMENTS 10,528,457 B2 1/2020 Everitt et al.
11,481,197 B1 * 10/2022 Comer ..................... G06F 8/65
(Continued)

FOREIGN PATENT DOCUMENTS

CN 104536744 A 4/2015
CN 106230889 A 12/2016
(Continued)

OTHER PUBLICATIONS

PCT International Search Report and Written Opinion (w/ English translations) for corresponding PCT Application No. PCT/CN2021/084159, mailed Dec. 29, 2021, 8 pages.

*Primary Examiner* — Noor Alkhateeb
(74) *Attorney, Agent, or Firm* — Dority & Manning, P.A.

(57) ABSTRACT

A program data package generation method, the method includes: obtaining configuration information of a target application program, the configuration information including an identifier of a platform to which the target application program is applicable; obtaining a data package of a target component in the target application program according to the configuration information, each target component being adapted to the platform; and calling a preset automated construction script, and generating a data package of the target application program according to the configuration information and the data package of the target component.

12 Claims, 11 Drawing Sheets

(56) References Cited

U.S. PATENT DOCUMENTS

| | | | | |
|---|---|---|---|---|
| 2005/0278724 | A1 | 12/2005 | Buskens et al. | |
| 2015/0052372 | A1* | 2/2015 | Barde | G06F 1/329 713/320 |
| 2015/0242204 | A1* | 8/2015 | Hassine | H04L 41/0853 717/121 |
| 2018/0234522 | A1* | 8/2018 | Curland | G06F 16/951 |
| 2019/0012402 | A1* | 1/2019 | Hitomi | G06F 8/65 |
| 2020/0150939 | A1* | 5/2020 | Strimpel | G06F 8/61 |
| 2021/0117165 | A1* | 4/2021 | Stang | G06F 8/71 |

FOREIGN PATENT DOCUMENTS

| | | | |
|---|---|---|---|
| CN | 107832057 | A | 3/2018 |
| CN | 108563432 | A | 9/2018 |
| CN | 108647032 | A | 10/2018 |
| CN | 109739478 | A | 5/2019 |
| CN | 109889587 | A | 6/2019 |
| CN | 110580147 | A | 12/2019 |
| CN | 111159108 | A | 5/2020 |
| CN | 111522623 | A | 8/2020 |
| CN | 111639019 | A | 9/2020 |

* cited by examiner

FIG. 3

PROGRAM DATA PACKAGE GENERATION METHOD, DEVICE AND STORAGE MEDIUM

CROSS-REFERENCE TO RELATED APPLICATION

This application is a national phase entry under 35 USC 371 of International Patent Application No. PCT/CN2021/084159 filed on Mar. 30, 2021, which is incorporated herein by reference in its entirety.

TECHNICAL FIELD

The present disclosure relates to the field of software technologies, and in particular, to a program data package generation method, a device and a storage medium.

BACKGROUND

In recent years, with the development of mobile software, more and more developers use component technology to develop mobile software based on mobile platforms, such as the Android platform or the IOS platform. The component technology may improve the efficiency of software development. The component is obtained by extracting and combining repeated codes in different software source codes. The component may usually be multiplexed, and is generally used to carry some independent functions.

SUMMARY

In an aspect, a program data package generation method is provided. The method includes: obtaining configuration information of a target application program, the configuration information including an identifier of a platform to which the target application program is applicable; obtaining a data package of a target component in the target application program according to the configuration information, each target component being adapted to the platform; and calling a preset automated construction script, and generating a data package of the target application program according to the configuration information and the data package of the target component.

In some embodiments, obtaining the data package of the target component in the target application program according to the configuration information includes: determining candidate components corresponding to the configuration information, the candidate components being adapted to the platform; in response to a first preset operation on at least candidate component of the candidate components, using an identifier of the at least one candidate component corresponding to the first preset operation as an identifier of the target component; and obtaining the data package of the target component according to the identifier of the target component.

In some other embodiments, the configuration information further includes a placeholder and a value corresponding to the placeholder. A data package of at least one target component in the target application program includes the placeholder. Calling the preset automated construction script, and generating the data package of the target application program according to the configuration information and the data package of the target component includes: calling the preset automated construction script to obtain a type of the target component; determining positions of different types of target components in the data package of the target application program according to the configuration information and the type of the target component; and replacing the placeholder in the data package of the at least one target component with the value corresponding to the placeholder according to the configuration information to obtain the data package of the target application program.

In some other embodiments, obtaining the configuration information of the target application program includes: displaying a configuration page in response to a trigger operation for generating the data package of the target application program, the configuration page including an input control for the placeholder and an input control for a platform parameter; obtaining information corresponding to the placeholder in response to a second preset operation on the input control for the placeholder in the configuration page, and using the information corresponding to the placeholder as the value of the placeholder; and obtaining information corresponding to the platform parameter in response to a third preset operation on the input control for the platform parameter in the configuration page, and using the information corresponding to the platform parameter as the identifier of the platform.

In some other embodiments, the method further includes: obtaining an identifier of the target component based on a preset plug-in, and registering the target component based on the identifier of the target component.

In some other embodiments, the target application program includes a first component and a second component. Both the first component and the second component inherit from a same parent class. The first component is configured to call the second component through a call request to perform a target task. The call request includes an identifier of the first component and an identifier of the second component. The target application program further includes routing information between components. The routing information between components includes a first relationship and a second relationship. The first relationship is a corresponding relationship between the identifier of the first component and an address of the first component. The second relationship is a corresponding relationship between the identifier of the second component and an address of the second component, and the second relationship is configured to locate the call request to the second component to perform the target task. The first relationship is configured to call back an execution result of the target task to the first component.

In some other embodiments, the call request further includes a generic message object. The generic message object includes the identifier of the second component. The generic message object is obtained according to a message builder.

In another aspect, an electronic device is provided, including: a processor and a memory configured to store instructions capable of being executed by the processor. The processor is configured to execute the instructions to implement a program data package generation method, which includes: obtaining configuration information of a target application program, the configuration information including an identifier of a platform to which the target application program is applicable; obtaining a data package of a target component in the target application program according to the configuration information, each target component being adapted to the platform; and calling a preset automated construction script, and generating a data package of the target application program according to the configuration information and the data package of the target component.

In some embodiments, obtaining the data package of the target component of the target application program according to the configuration information includes: determining candidate components corresponding to the configuration information, the candidate components being adapted to the platform; in response to a first preset operation on at least one candidate component of the candidate components, using an identifier of the at least one candidate component corresponding to the first preset operation as an identifier of the target component; and obtaining the data package of the target component according to the identifier of the target component.

In some other embodiments, the configuration information further includes a placeholder and a value corresponding to the placeholder, and a data package of at least one target component in the target application program includes the placeholder. Calling the preset automated construction script, and generating the data package of the target application program according to the configuration information and the data package of the target component includes: calling the preset automated construction script to obtain a type of the target component; determining positions of different types of target components in the data package of the target application program according to the configuration information and the type of the target component; and replacing the placeholder in the data package of the at least one target component with the value corresponding to the placeholder according to the configuration information to obtain the data package of the target application program.

In some other embodiments, obtaining the configuration information of the target application program includes: displaying a configuration page in response to a trigger operation for generating the data package of the target application program, the configuration page including an input control for the placeholder and an input control for a platform parameter; obtaining information corresponding to the placeholder in response to a second preset operation on the input control for the placeholder in the configuration page, and using the information corresponding to the placeholder as the value of the placeholder; and obtaining information corresponding to the platform parameter in response to a third preset operation on the input control for the platform parameter in the configuration page, and using the information corresponding to the platform parameter as the identifier of the platform.

In some other embodiments, the program data package generation method further includes: obtaining an identifier of the target component based on a preset plug-in, and registering the target component based on the identifier of the target component.

In some other embodiments, the target application program includes a first component and a second component. Both the first component and the second component inherit from a same parent class. The first component is configured to call the second component through a call request to perform a target task. The call request includes an identifier of the first component and an identifier of the second component. The target application program further includes routing information between components. The routing information between components includes a first relationship and a second relationship. The first relationship is a corresponding relationship between the identifier of the first component and an address of the first component. The second relationship is a corresponding relationship between the identifier of the second component and an address of the second component, and the second relationship is configured to locate the call request to the second component to perform the target task. The first relationship is configured to call back an execution result of the target task to the first component.

In some other embodiments, the call request further includes a generic message object. The generic message object includes the identifier of the second component. The generic message object is obtained according to a message builder.

In yet another aspect, a non-transitory computer-readable storage medium is provided. The non-transitory computer-readable storage medium has stored therein instructions that, when executed by a processor of an electronic device, cause the processor to perform the program data package generation method as described in any one of the above embodiments.

In yet another aspect, a computer program product embodied on a non-transitory computer-readable medium is provided. The computer program product includes computer program instructions that, when run on a computer, cause the computer to perform the program data package generation method as described in any one of the above embodiments.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art can obtain other drawings according to these drawings. In addition, the accompanying drawings in the following description may be regarded as schematic diagrams, but are not limitations on an actual size of a product, an actual process of a method and an actual timing of a signal involved in the embodiments of the present disclosure.

FIG. 3 is a configuration page diagram, in accordance with some embodiments;

DETAILED DESCRIPTION

Figure 1A:
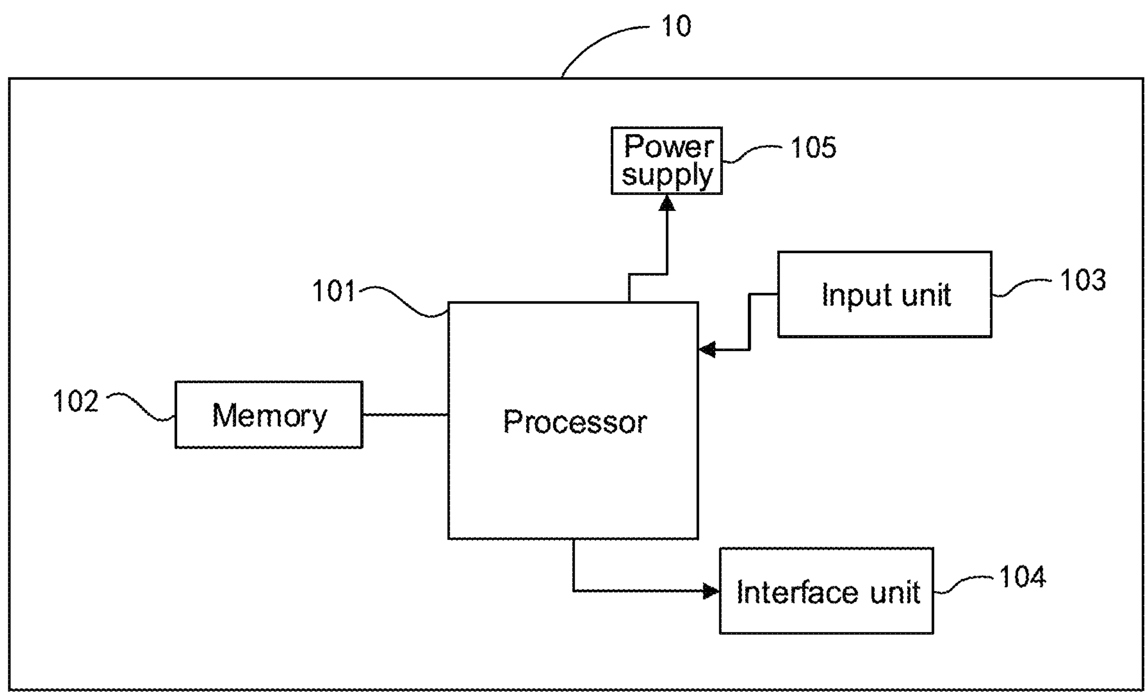
FIG. 1A is a structural diagram of an electronic device, in accordance with some embodiments.

First, some terms involved in the embodiments of the present disclosure are briefly introduced.

Unless the context requires otherwise, throughout the description and the claims, the term “comprise” and other forms thereof, such as the third-person singular form “comprises" and the present participle form "comprising" are construed in an open and inclusive meaning, i.e., "including, but not limited to". In the description of the specification, the terms, such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or examples(s). In addition, the specific features, structures, materials or characteristics may be included in any one or more embodiments or examples in any suitable manner.

Hereinafter, the terms "first" and "second" are only used for descriptive purposes, but are not to be construed as indicating or implying relative importance or implicitly indicating the number of indicated technical features. Thus, features defined with "first" and "second" may explicitly or implicitly include one or more of the features. In the description of the embodiments of the present disclosure, the term "a plurality of/the plurality of" means two or more unless otherwise specified.

Some embodiments may be described using the expression "coupled" and "connected" along with their derivatives. For example, term "connected" may be used in the description of some embodiments to indicate that two or more components are in direct physical or electrical contact with each other. For another example, term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the content herein.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

As used herein, the term "if" is optionally construed as "when" or "in a case where" or "in response to determining that" or "in response to detecting" depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

The use of the phrase "applicable to" or "configured to" herein means an open and inclusive language, which does not exclude devices that are applicable to or configured to perform additional tasks or steps.

In addition, the use of the phrase "based on" or "according to" is meant to be open and inclusive, since a process, step, calculation or other action that is "based on" or "according to" one or more of the stated conditions or values may, in practice, be based on additional conditions or values exceeding those stated.

At present, with the popularization of smart mobile devices and the development of mobile Internet businesses, the demand for mobile software development is also increasing. In the traditional development mode for mobile software, the developer creates new application engineering projects and then develops basic functions, such as basic user interface (UI), local database, and network configuration, and then implements business functions according to requirements documents, design documents, etc. In the process of implementing the business functions, if similar components have been developed in other projects, the developer will copy corresponding codes of the components and perform secondary development. This development mode has low development efficiency and long development cycle. In light of this, the present disclosure provides a program data package generation method to solve the problems of low development efficiency and long development cycle in the traditional development mode.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on embodiments of the present disclosure shall be included in the protection scope of the present disclosure.

The program data package generation method provided by the embodiments of the present disclosure may be implemented by an electronic device 10 as shown in FIG. 1A. FIG. 1A is a structural diagram of the electronic device to which the technical solutions provided by the embodiments of the present disclosure are applicable. The electronic device 10 in FIG. 1A includes but is not limited to: a processor 101, a memory 102, an input unit 103, an interface unit 104, a power supply 105, and so on.

The processor 101, being the control center of the electronic device, uses various interfaces and lines to connect various parts of the entire electronic device, and performs various functions of electronic equipment and processes data by running or executing software programs stored in the memory 102 and/or modules and calling data stored in the memory 102, so as to monitor the electronic equipment as a whole. The processor 101 may include one or more processing units. In some examples, the processor 101 may integrate with an application processor and a modem processor, where the application processor mainly handles the operating system, the user interface, the application programs, etc., and the modem processor mainly handles wireless communication. It will be understood that the modem processor may not be integrated in the processor 101.

The memory 102 may be used to store software programs and various data. The memory 102 may mainly include a region for storing program and a region for storing data, where the region for storing program may store the operating system, an application program required by at least one function unit, and the like. The memory 102 may include a high-speed random access memory, and may further include a non-volatile memory, e.g., at least one magnetic disk storage device, a flash memory device, or other volatile solid state storage devices. In some examples, the memory 102 may be a non-transitory computer-readable storage medium. For example, the non-transitory computer-readable storage medium may be a read-only memory (ROM), a random access memory (RAM), a CD-ROM, a magnetic tape, a floppy disk, an optical data storage device, or the like.

The input unit 103 may be a device, such as a keyboard, a touch screen, or the like.

The interface unit 104 is an interface for connecting an external device and the electronic device 10. For example, the external device may include a wired or wireless headset port, an external power supply (or a battery charger) port, a wired or wireless data port, a memory card port, a port for connecting a device with an identification module, an audio input/output (I/O) port, a video I/O port, a headphone port, or the like. The interface unit 104 may be used to receive input (e.g., data information) from the external device and transmit the received input to one or more elements in the electronic device 10, or it may be used to transmit data between the electronic device 10 and the external device.

The power supply 105 (e.g., a battery) may be used to supply power to various components. In some examples, the power supply 105 may be logically connected to the processor 101 through a power management system, so as to implement functions, such as managing charging and discharging, and power consumption management through the power management system.

In some examples, computer instructions in the embodiments of the present disclosure may also be referred to as application program codes or systems, which are not limited in the embodiments of the present disclosure.

It will be noted that the electronic device shown in FIG. 1A is only considered as an example, which does not constitute a limitation to the electronic device to which the embodiments of the present disclosure are applicable. In actual implementation, the electronic device may include more or less equipment or devices than those shown in FIG. 1A.

Before implementing the program data package generation method provided by the embodiments of the present disclosure, an automated development management system may be constructed first, which includes five parts: a mobile application open platform, a component and mobile application management background, a component source code hosting platform, a component package hosting platform, and a program data package generation system. Through the mobile application open platform, the system interfaces with specific users, displays business portals, such as a component resource pool and component detailed information, and provides an operation platform for the program data package generation system.

The mobile application open platform is an entrance for users to interact with the program data package generation system. And the mobile application open platform is mainly connected with the component and mobile application management background through a method of calling a network interface, and mainly includes modules, such as user management, component management, program data package generation management and authority management.

The component and mobile application management background is mainly used to store component and mobile application information and its details, and provides business data for the mobile application open platform. And the component and mobile application management background mainly includes a component management background, a mobile application management background, a business service background, a data background, etc.

The component source code hosting platform is mainly used to store and manage component source codes. And the component source code hosting platform may further be used as an independent closed-loop system, and may also perform operations, such as source code downloading through an external interface provided thereby. A user management module of the component source code hosting platform may only be used to manage users who use the component source code hosting platform.

The component package hosting platform is mainly used to store and manage a dependency package of the components. And the component package hosting platform may be used as an independent closed-loop system, and may also perform operations, such as downloading the dependency package of the component through the external interface provided thereby. A user management module of the component package hosting platform may only be used to manage users who use the component package hosting platform.

The program data package generation system is mainly used for automatic generation of the program data package, workflow management, etc., which may be used as an independent closed-loop system. And the program data package generation system may also provide an external interface; the component and mobile application management background calls the external interface provided by the program data package generation system through a method of network connection to pass construction parameters to the program data package generation system, so as to achieve the automatic generation of the program data package.

Figure 1B:
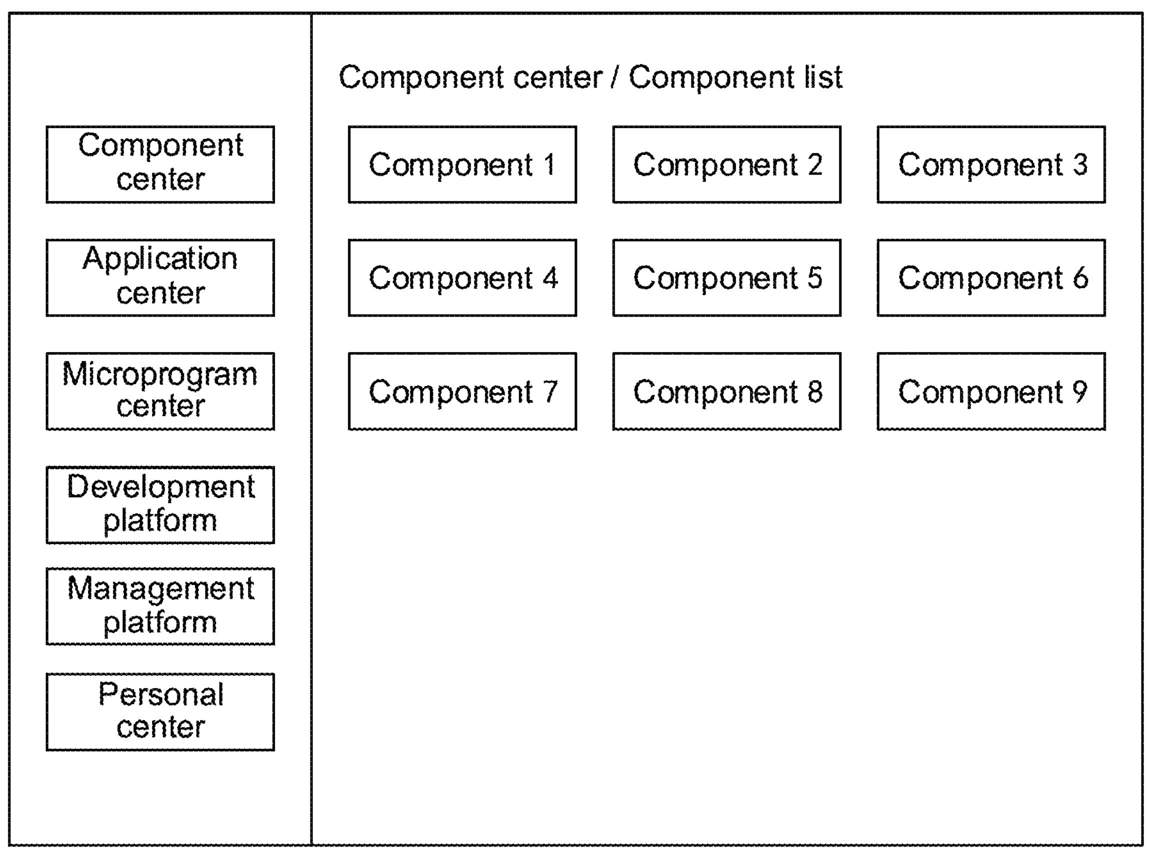
FIG. 1B is a page diagram of a mobile application open platform, in accordance with some embodiments.

For example, the page of the mobile application open platform is shown in FIG. 1B. The mobile application open platform includes functional modules in the left menu bar, such as: a component center module, an application center module, a microprogram center module, a development platform module, a management platform module and a personal center module.

Where the component center module may display a list of all components stored in the system, and the components may be arranged in a card layout to display content of each component. The content of the component includes but is not limited to: component name, component type, component category, component version, component applicable platform, component developer, the number of references to the component, the support situation about horizontal and vertical screens of the component, the default resolution supported by the component, brief description of the component, etc. The users may perform operations, such as component collection, component detail query, and component filtering on the current page.

The application center module may display a list of mobile applications that has been successfully built by the system. The display content includes: application name, application category, application popularity (the number of application downloading), application downloading quick response (QR) code, application version number, application details query button, application local download button, etc. The electronic device may also display the detailed information of the application in response to the query operation. The detailed information includes: application name, application category, application popularity (the number of application downloading), application downloading QR code, application version number, application release time, the support situation about application platform, application screenshots, application short-form videos, application description, application manager, in-app component list, in-app microprogram list, etc.

The microprogram center module may display the information of all microprograms stored in the system. The difference between the microprogram and the component is that the microprogram is designed based on cross-platform technology, which is different from an objective situation of component customization. The microprogram has features of cross-platform, lightweight, and easy to integrate. The functions and the page of the microprogram center module are similar to those of the component center module, which will not be repeated here. The information of the microprogram includes, but is not limited to: microprogram name, release time, size situation of the microprogram package, type of the microprogram scene, person in charge, support situation about horizontal and vertical screens of the microprogram, default resolution supported by the microprogram, and brief description of the microprogram.

The development platform module mainly includes three parts: a component management module, an application management module and a microprogram management module.

Where the component management module is mainly used to display a list of all components released, collaboratively managed and/or collected by the user. The component management module provides a function of adding new components. The detailed information of the component includes: component name, component release time, component version, component category, the number of references to the component, component state and/or component operation function list, etc. The component state includes, but is not limited to: to be launched, already has been launched, already has been pulled down, and not approved.

The electronic device needs to obtain basic information of the component when adding new components. The basic information of the component includes: component name, component version number, component applicable platform, display type, component default resolution, component category, component source code storage path, component data package dependency path, component source code version number, data package version number of the component, internal dependency situation of the component, component coordinator list, component pictures and related short-form videos, component details, etc. Then, the electronic device transfers the basic information of the component to the component and mobile application management background through the method of calling the network interface, and the background will publish the obtained basic information of the component on the mobile application open platform.

The application management module provides a function of displaying application information and a function of creating applications. The application information includes: application name, application release time, application version, application category, application supportable platform, application state, resolution, display type, application operation function list, etc. Where the application state includes but is not limited to: already has been launched, and not completed.

The electronic device obtains the application information, and transfers the application information to the component and mobile application management background through the method of calling the network interface. The background system will transfer parameters required for construction to the program data package generation system by filtering parameters and calling the program data package generation system. The program data package generation system generates a data package of the application by calling preset automated construction scripts corresponding to the mobile application type. In some examples, the electronic device constructs and publishes the generated program data packages.

The management platform module mainly includes two parts: an audit management module and a user management module.

The user permission in the system may be divided into three types: an ordinary user, a developer, and an administrator, permission of which increases in sequence. The administrator may view and use all the functions of the management platform module.

The audit management module is mainly used to display the states of all the components and microprograms, and may perform related approval operations on them. The approval operations include: details query, failing, pass, deleting, pulling down, relaunching, viewing reasons, etc.

The user management module may be used to display all user details and permission types, and may perform related permission modification operations on them. The modification operations include: details query, editing, deleting, batch deleting, adding users, etc.

The personal center module is mainly used to display the personal details of the current user. The details include: account number, user name, email address, institution and organization, phone number, and avatar. Users may perform operations such as password modification, information update and avatar uploading on this page.

The interaction between a person and the mobile application open platform described above includes the following scenarios.

In a first scenario, a code developer may use a component platform of the component management module to add new components. Adding new components are mainly divided into three stages: a development stage, a component packaging stage, and a component platform registration stage. After the code developer completes the development of the component, he/she will upload a data package that the component depends on through the component package hosting platform, and upload the component source code through the component source code hosting platform. After completion, the process will enter the component platform registration stage, and the code developer will publish other detailed information of the component, component source code address, and the data package address that the component depends on through the mobile application open platform, the development platform module, the component management module, and an adding new components function, sequentially.

In a second scenario, the code developer may use the platform to find and use components. The developer may perform operations such as component browsing, viewing, and detailed dependency traversal. As for components that can be reused, the developer may reuse the overall data package of the component through the queried details, or perform a subsequent operation of modifying the source codes after downloading the source codes.

In a third scenario, a business personnel may use the mobile application open platform to generate application data packages. The business personnel may input configuration information of an application program, and query components according to the configuration information, and select a component from the displayed components, and then click a generation button to generate the data package of the application program. In some examples, the business personnel may further construct an installation package of the application program after the data package of the application program is generated, and transmit the installation package to the mobile application open platform to store and release the software, and generate and release a QR code.

It will be noted that the foregoing is only an exemplary description of the system to which the program data package generation method is applicable, data package management of the component, and the operation platform of the program data package generation method provided by the embodiments of the present disclosure. The data package management of the component, the system to which the program data package generation method is applicable, and the operation platform of the program data package generation method are not limited in the embodiments of the present disclosure.

Figure 2:
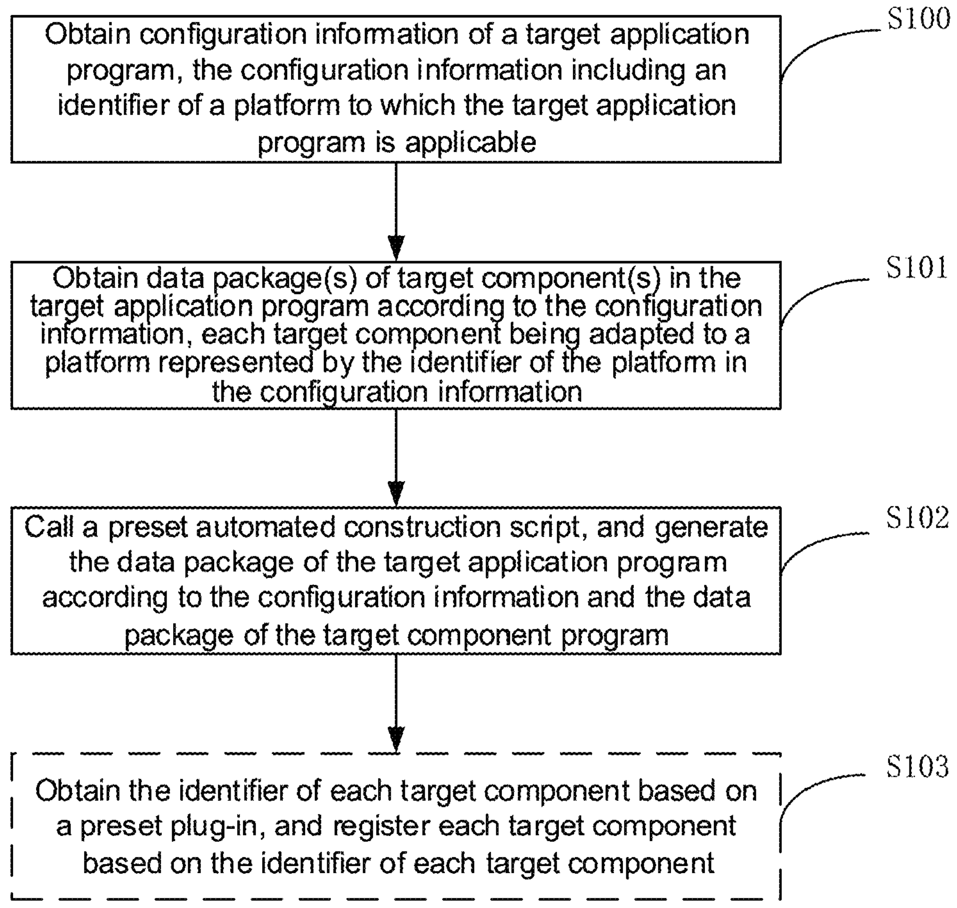
FIG. 2 is a flow diagram of a program data package generation method, in accordance with some embodiments.

FIG. 2 is a flow diagram of a program data package generation method provided by the embodiments of the present disclosure, which is applicable to the third scenario. The method may be applied to the electronic device shown in FIG. 1A, and the method shown in FIG. 2 may include the following steps.

In S100, the electronic device obtains configuration information of a target application program. The configuration information includes an identifier of a platform to which the target application program is applicable.

In a possible implementation manner, first, the electronic device displays a configuration page in response to a trigger operation for generating the application program data package. The configuration page includes an input control for a placeholder and an input control for a platform parameter. Then, the electronic device obtains information corresponding to the placeholder in response to a second preset operation on the input control for the placeholder in the configuration page, and uses the information corresponding to the placeholder as a value of the placeholder. The electronic device obtains information corresponding to the platform parameter in response to a third preset operation on the input control for the platform parameter in the configuration page, and uses the information corresponding to the platform parameter as the identifier of the platform.

Figure 3:
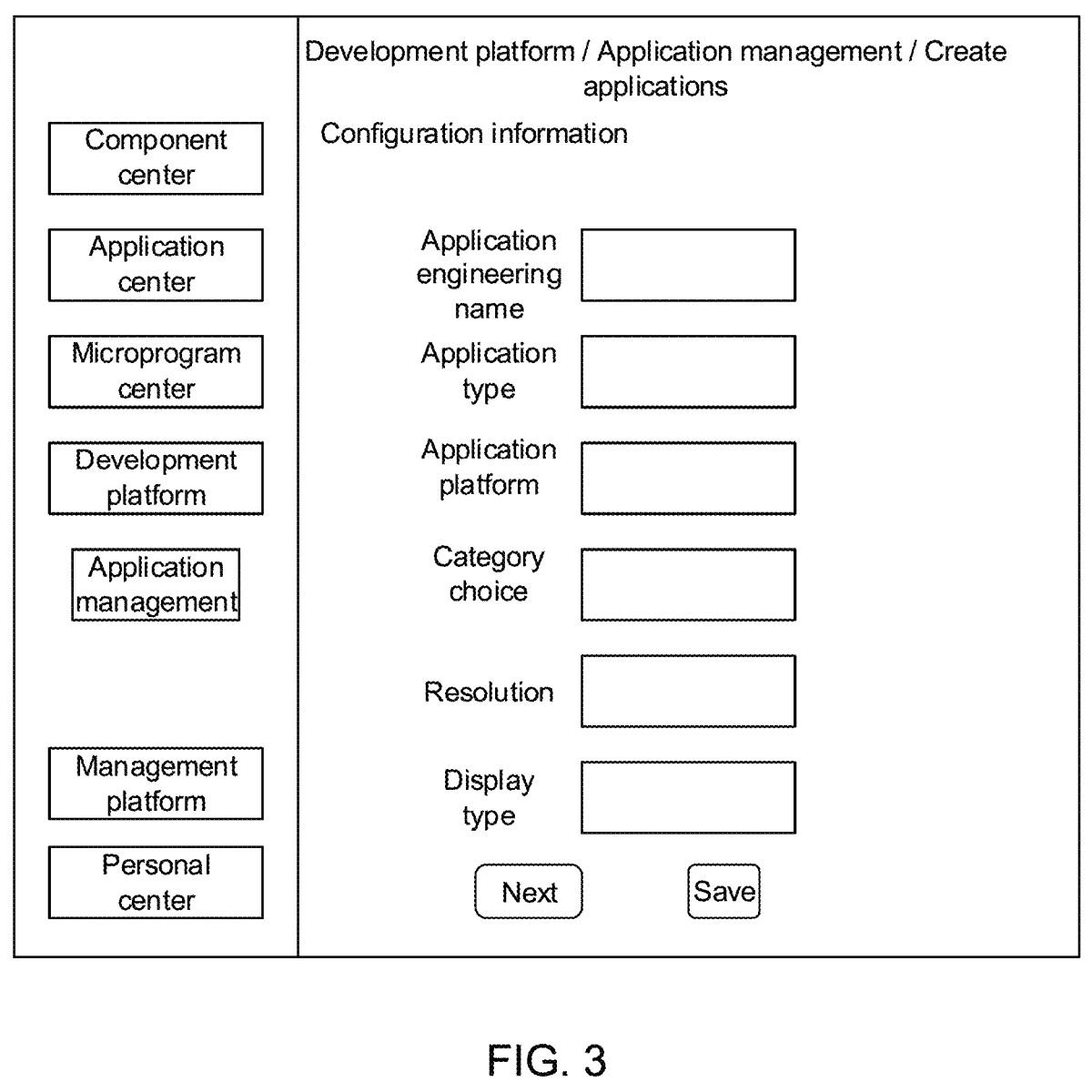

For example, the electronic device displays the configuration page as shown in FIG. 3 in response to the trigger operation for generating the application data package; and the user inputs corresponding configuration information on the configuration page, such as application engineering name, application type, application platform, application category, resolution, display type, and the like shown in FIG. 3. The electronic device obtains the configuration information of the target application program in response to the input operation on the configuration page. The configuration information of the target application program includes the value of the placeholder (e.g., a content input in a text box with the application engineering name shown in FIG. 3), and the value of the placeholder may be the identifier of the target application program. The application type is, for example, a single-platform application or a cross-platform application. The identifier of the platform to which the application is applicable (e.g., a content input in a text box with the application platform shown in FIG. 3) is, for example, an Android platform, an Apple (IOS) platform, or a Microsoft (Windows) platform. The display type is, for example, a horizontal screen display or a vertical screen display.

In another possible implementation manner, the electronic device obtains a file including the configuration information, and parses the file including the configuration information to obtain the configuration information of the target application program.

For example, the electronic device obtains the file including the configuration information in response to an operation of uploading the file by the user, and parses the file including the configuration information to obtain the configuration information of the target application program.

In S101, the electronic device obtains data package(s) of target component(s) in the target application program according to the configuration information, and each target component is adapted to a platform represented by the identifier of the platform in the configuration information.

First, the electronic device determines candidate components corresponding to the configuration information, and the candidate components are adapted to the platform represented by the identifier of the platform; then in response to a preset operation on at least one candidate component of the candidate components, the electronic device uses an identifier of the at least one candidate component corresponding to the preset operation as an identifier of the target component. And then, the electronic device obtains the data package of the target component according to the identifier of the target component. The electronic device has stored a corresponding relationship between the identifier of the component and the data package of the component.

Figure 4A:
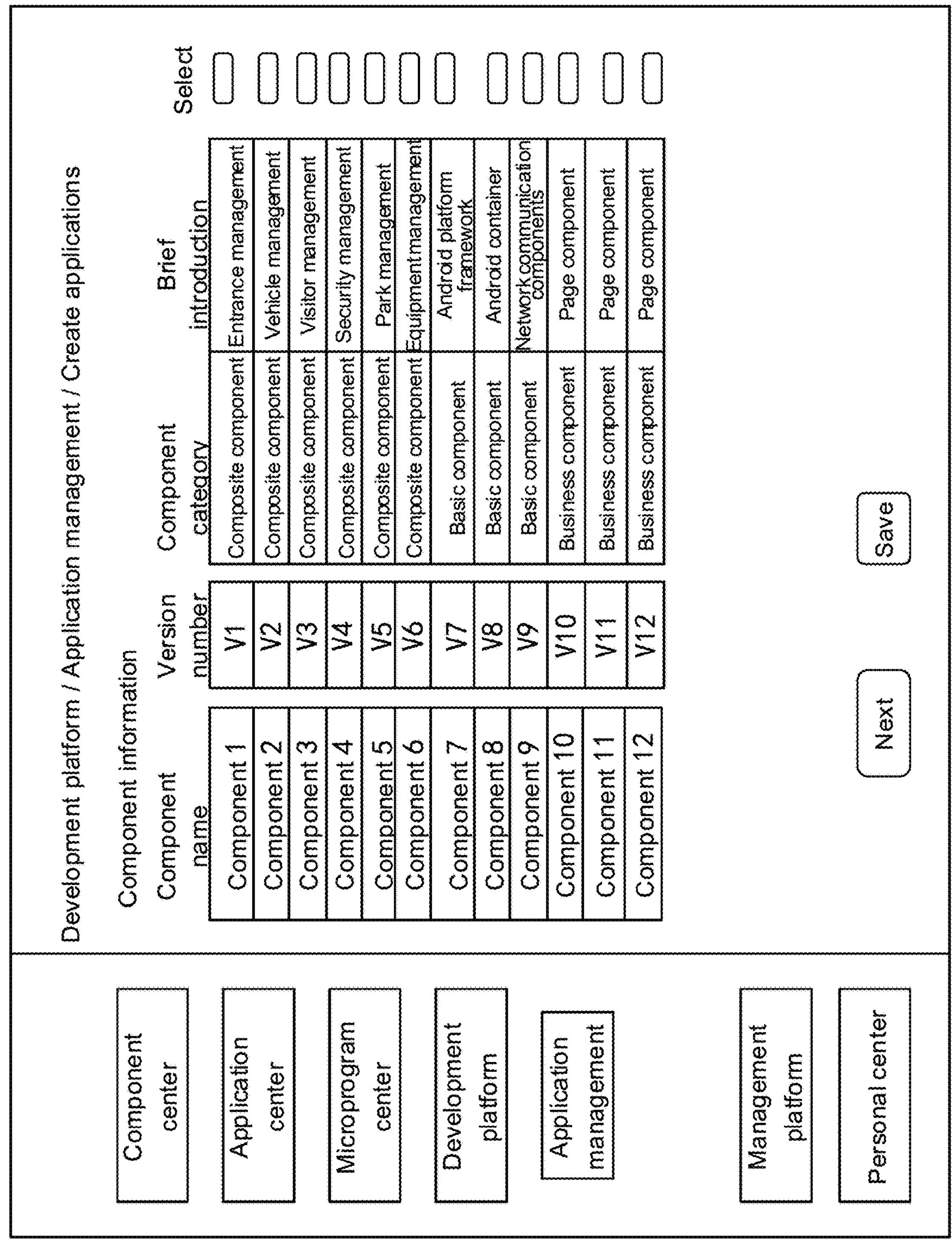
FIG. 4A is a display page diagram of candidate components, in accordance with some embodiments.
Figure 4B:
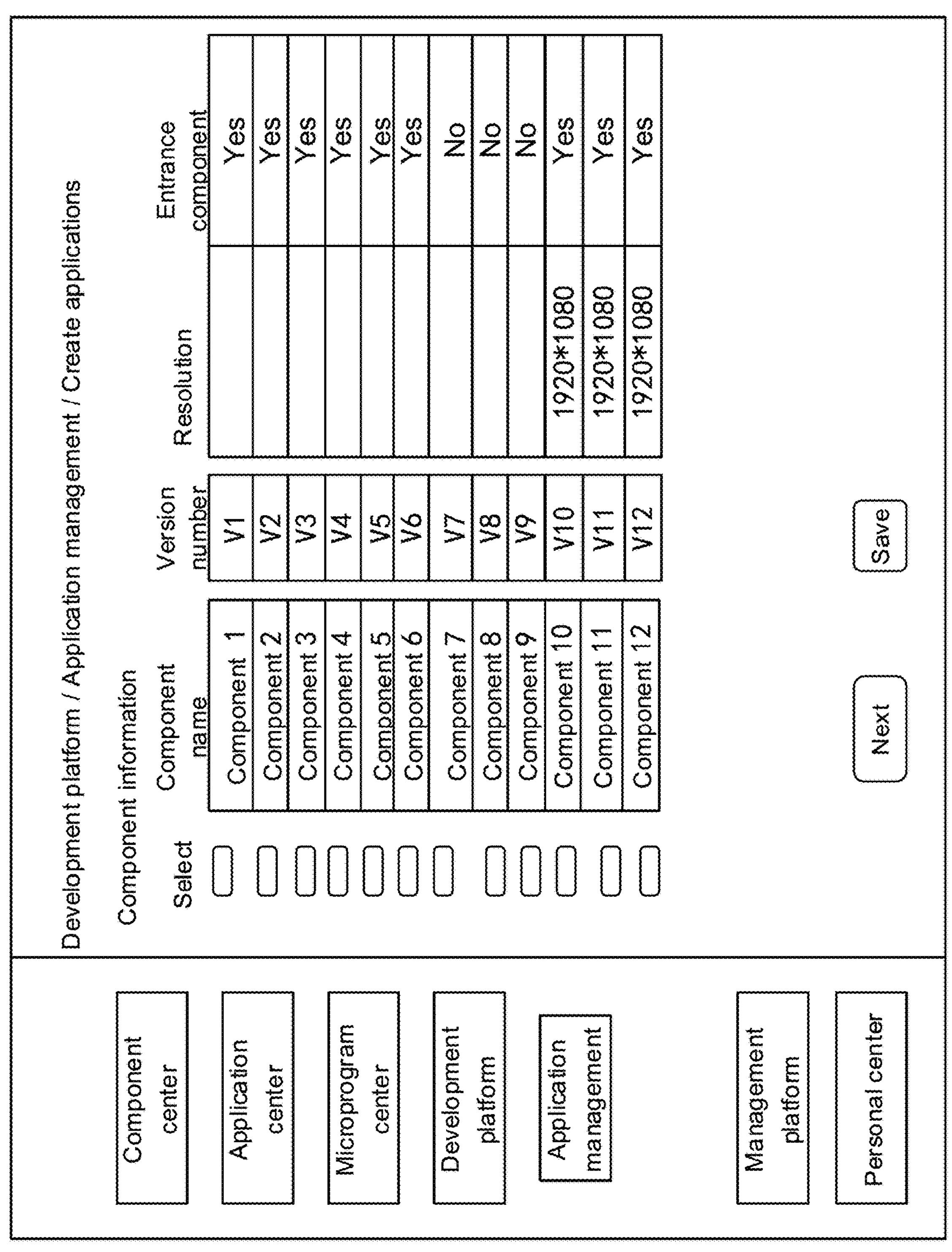
FIG. 4B is a display page diagram of candidate components, in accordance with some other embodiments.

Based on the example in FIG. 3, the electronic device determines the candidate components corresponding to the configuration information according to the configuration information input in the text boxes in FIG. 3. Then the user selects the target component(s) in the selection boxes on the display page of the candidate components as shown in FIG. 4A. Alternatively, the user selects the target component(s) in the selection boxes on the display page of the candidate components as shown in FIG. 4B. In response to the selection operation on the at least one candidate component, the electronic device uses the candidate component(s) corresponding to the selection operation as the target component(s). Then the electronic device obtains the data package of the component corresponding to the identifier of the target component from a component library according to the identifier of the target component. The component library includes the corresponding relationship between the identifier of the component and the data package of the component.

In S102, the electronic device calls a preset automated construction script, and generates a data package of the target application program according to the configuration information and the data package of the target component.

In some examples, the configuration information includes a placeholder and a value corresponding to the placeholder. A data package of at least one target component includes the placeholder in the configuration information.

The electronic device calls the preset automated construction script, obtains the type of the target component, and determines positions of different types of target components in the data package of the target application program according to the configuration information and the type of the target component. The electronic device replaces the placeholder in the data package of the at least one target component with the value corresponding to the placeholder according to the configuration information to obtain the data package of the target application program.

In the embodiments of the present disclosure, the electronic device may obtain the configuration information, and determine the candidate components according to the obtained configuration information, and then obtain the target component from the candidate components, and finally generate the data package of the target application program according to the target component and the preset automated construction script. In this way, after simple training, a non-developer may also get the target application program according to the program data package generation method provided by the embodiments of the present disclosure, after inputting the configuration information of the target application program and obtaining the target component according to the configuration information, thus solving the problem of low efficiency and long development cycle of developing and obtaining the data package of the target application program in the traditional development mode.

Subsequently, the electronic device may call the automated construction script to compile the data package of the target application program, so as to obtain an installation package of the target application program.

For example, the electronic device obtains the type of the target component, and the type of the target component may be a layout type, a service type, a library type, or the like. The electronic device determines the position of the data package of the target component in the data package of the target application program according to the type of the data package of the target component and the identifier of the platform in the configuration information. In a case where the type of the target component is a front-end layout type and the platform to which the target application program is applicable is the Android platform, the electronic device determines a folder where the data package of the target component is laid out in the data package of the target application program. Assuming that the configuration information includes the identifier of the target application program and the placeholder corresponding to the identifier of the target application program, the electronic device replaces the placeholder corresponding to the identifier of the target application program in the at least one target component with the identifier of the target application program. After the electronic device automatically replaces the placeholder in the data package of the target component, it will obtain the data package of the target application program.

In some examples, in S103, the electronic device obtains the identifier of each target component based on a preset plug-in, and registers each target component based on the identifier of each target component.

During the process of packaging the target application program or the process of publishing the target application program, the electronic device obtains the identifier of each target component based on the plug-in, and registers each target component based on the identifier of each target component. Registration information of the target component includes the identifier of the target component and an applicable scope of the target component in the target application program. Subsequently, the electronic device may generate routing information of the target component according to the registration information of the target component when it is started. The routing information of the target component includes a physical address corresponding to the identifier of the target component, and other target components that may be called by a first target component. The first target component is any one of the target components, and the other target components are target components other than the first target component.

Figure 5A:
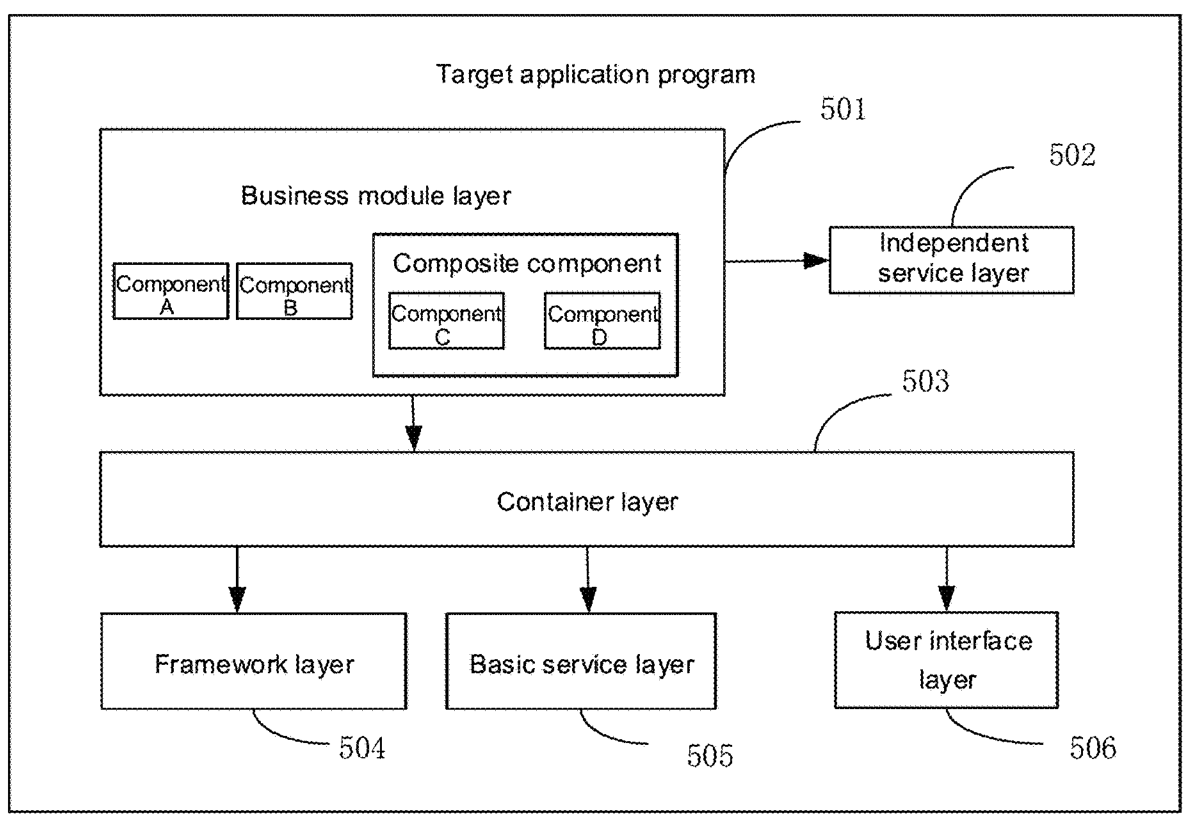
FIG. 5A is an architecture diagram of a target application program, in accordance with some embodiments.

In an example, an architecture of the target application program packaged or published by the electronic device is shown in FIG. 5A. The target application program shown in FIG. 5A includes a business module layer 501, an independent service layer 502, a container layer 503, a framework layer 504, a basic service layer 505 and a user interface layer 506. The business module layer 501 includes business components and/or composite business components. In a case where the target application program is mobile software, the business module layer 501 corresponds to a "business component" category in the mobile application open platform; the container layer 503 corresponds to a "basic component" category in the mobile application open platform, and depends on the inside of application software by default; the independent service layer 502 corresponds to a "service component" category in the mobile application open platform; the framework layer 504 corresponds to the "basic component" category in the mobile application open platform; the basic service layer 505 corresponds to the "basic component" category in the mobile application open platform; the user interface layer 506 corresponds to the "business component" category in the mobile application open platform. The routing information between the target components generated by the above electronic device according to the registration information of the target component may be stored in a routing management module of the container layer.

Subsequently, after starting the target application program, the electronic device generates the routing information between components in the target application program according to the identifier of the target component, and the routing information between components includes a corresponding relationship between the identifier and the addresses of the component. The message transmission between the components may be completed based on the routing information between components.

Figure 5B:
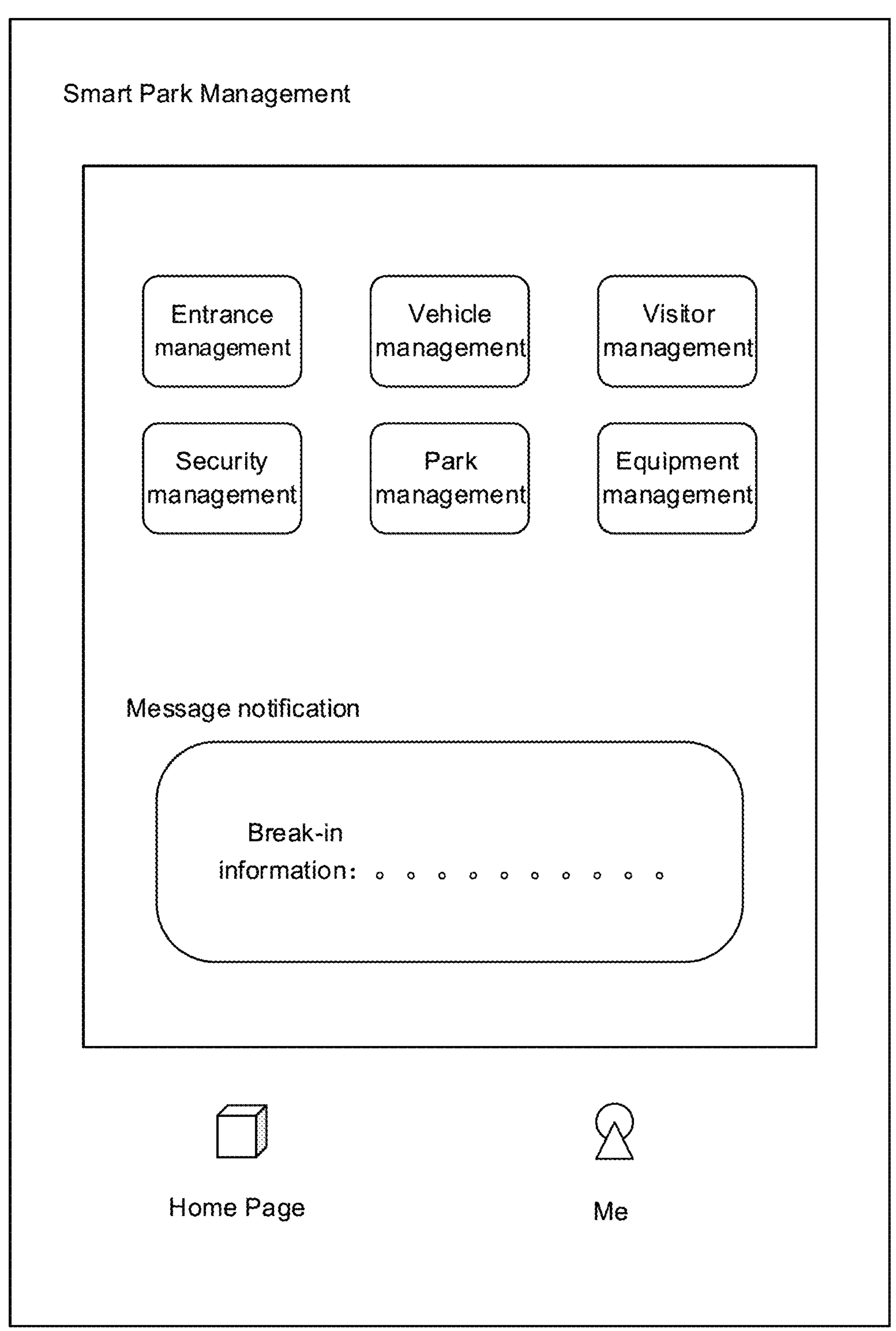
FIG. 5B is a homepage diagram of a target application program, in accordance with some embodiments.

Based on the example of FIG. 4A, assuming that the target components includes ten components: component 1 to component 10, a homepage of the target application program generated by the electronic device after startup is as shown in FIG. 5B. The homepage includes entrance management, vehicle management, visitor management, park management, equipment management, etc. It will be noted that the program data package generation method provided by the embodiments of the present disclosure may also generate a data package of composite business components such as the entrance management, the vehicle management, the visitor management, the park management, or the equipment management. The composite business component includes at least one component. The embodiments of the present disclosure do not limit thereto.

Software in the Android platform (Android software for short) is considered as an example, generally, component call requests between components in the Android software are divided into four types of call requests: calling pages, calling services, obtaining data, and transmitting messages. Therefore, through the unified component-based platform specification and the design method of bus routing communication components, the transmission of these four call requests between components may be achieved, so as to achieve a purpose of decoupling between components.

In a case where the call request is the calling pages, it is generally managed by Fragment or Activity. The plug-in may be an annotation processing tool (APT) plug-in. The APT plug-in scans and extracts tag information (e.g., (@PAGE)) corresponding to the target component, and registers the identifier of the component in the calling pages class information to the routing management module (also known as a bus routing component); through a direct instantiation, the identifier returns the entity class of the Fragment or the entity class of the Activity represented by the identifier of the component when used.

In a case where the call request is the calling service, a startup mechanism of the service component is based on a content provider of Android (ContentProvider). First, the electronic device generates a service table of the target component through a method of APT plug-in annotation extraction, and registers the service table in the routing management module. In this way, when an annotation corresponding to a service (i.e., the identifier of the target component) is used, the electronic device automatically generates a service entity class corresponding to an annotation named as the method name in @Service+ServiceProvider as a whole, according to a template of a service provider (ServiceProvider). The electronic device internally has corresponding functions to start services in the service table and automatically registers information of the provider component in the manifest.xml of the component, and declares node information (also known as address) of the corresponding provider. Finally, when a component A starts an application program interface (API) of a service B through the routing component, the routing management module of the electronic device will achieve the purpose of calling the service information method by encapsulating the use of the corresponding content provider.

Figure 5C:
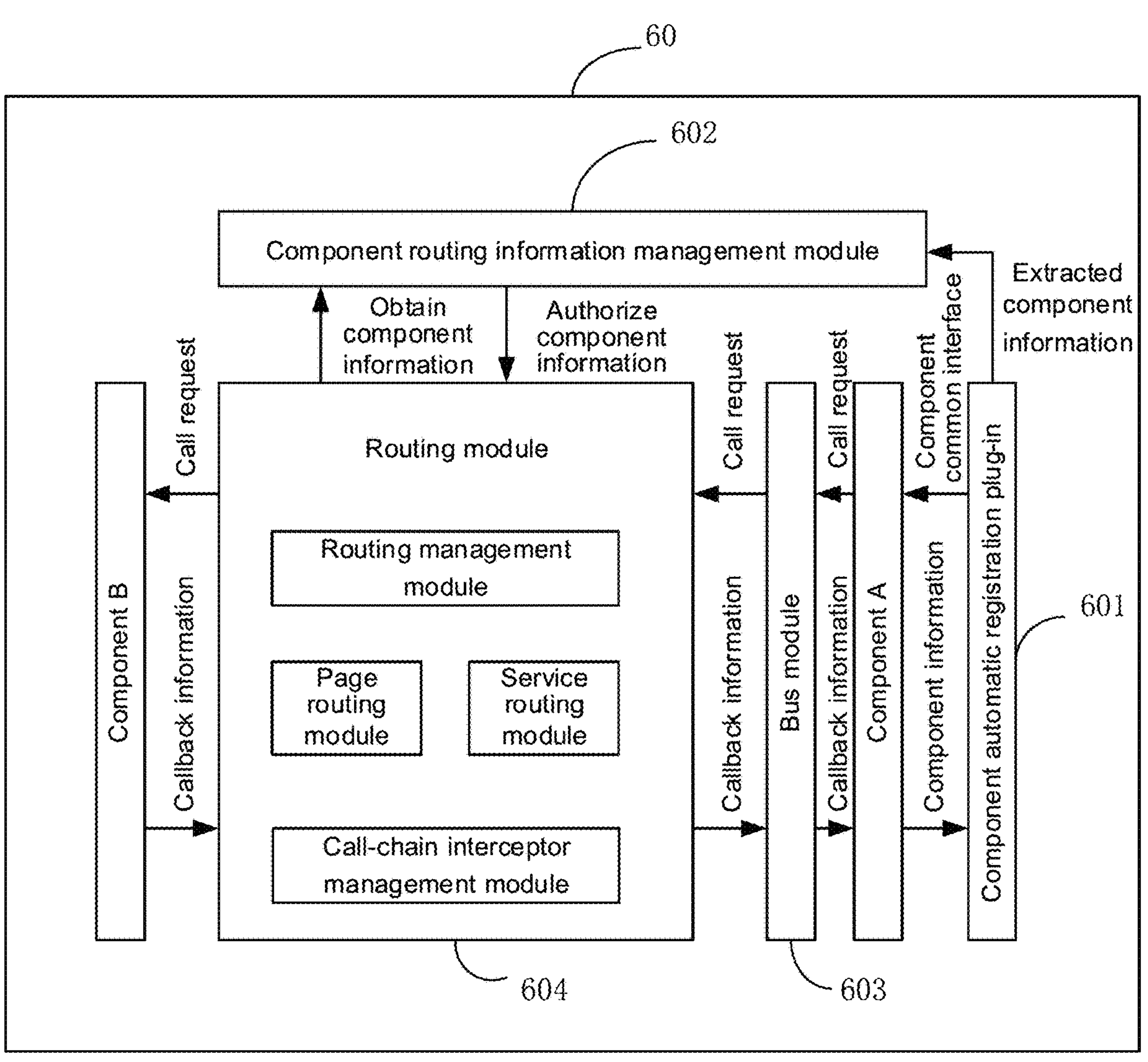
FIG. 5C is a diagram of routing management system between components, in accordance with some embodiments.

Assuming that the target application program packaged and published is a mobile software based on Android, the target application program encapsulates the business component in the container layer, and performs data communication through the bus routing mechanism. The target application program calls the underlying basic service, the platform framework, the platform application component content, and the like through the bus routing mechanism. For example, a routing management system 60 between components in the embodiments of the present disclosure is shown in FIG. 5C. The routing management system includes a component automatic registration plug-in 601, a component routing information management module 602, a bus module 603, and a routing module 604. The component automatic registration plug-in 601 is used to scan subclass component information of the target parent class component in the target application program during a compilation process of the target application program. The subclass component inherits universal interfaces of the target parent class component. The component automatic registration plug-in 601 sends the extracted component information to the component routing information management module 602, and the component information is used for the component routing information management module to register components. The routing module 604 obtains authorized component information that conforms to an authorization policy from the component routing information management module 602 when the target application program is started, and generates routing information of each authorized component (i.e., a component that is capable of being discovered by the routing module) (e.g., generates a corresponding instance for each component). The bus module 603 is used to transmit messages between components. In FIG. 5C, the component A sends a call request to the routing module 604 through the bus module 603. After receiving the call request, the routing management module in the routing module 604 determines whether the request is a “page request” or a “service request” to determine an instance of the component B requested by the call request of the component A, and passes the call request of the component A to the instance of the component B. After the instance of the component B completes the call request of the component A, it returns callback information to the component A through the same link to complete the entire process of this bus event.

Figure 6:
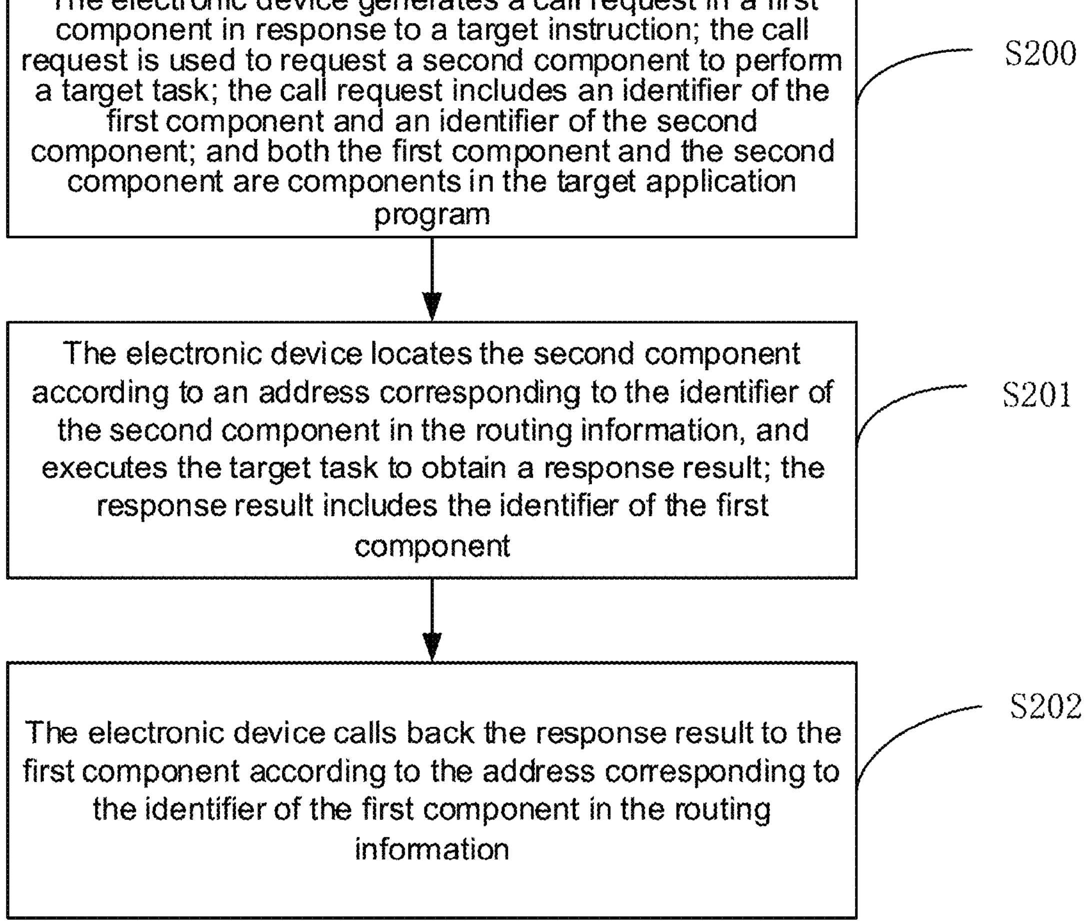
FIG. 6 is a flow diagram of a method for message transfer between components in automatically generated software, in accordance with some embodiments.

FIG. 6 is a flow diagram of a method for message transmission between components in software that is automatically generated provided by embodiments of the present disclosure. The method may be applied to the electronic device shown in FIG. 1A, and the method shown in FIG. 6 may include the following steps.

In S200, the electronic device generates a call request in a first component in response to a target instruction. The call request is used to request a second component to perform a target task. The call request includes an identifier of the first component and an identifier of the second component. Both the first component and the second component are components in the target application program.

It will be noted that the embodiments of the present disclosure do not limit the trigger method of the target instruction. In a possible implementation manner, the electronic device responds to a target operation on the first component in the target application program, and an instruction sent by the target operation to the electronic device is the target instruction. In another possible implementation manner, the electronic device generates the target instruction in a process of running the first component in the target application program.

In some examples, the call request includes a generic message object, and the generic message object includes the identifier of the second component. The generic message object is obtained according to a message builder.

For example, the structure of the generic message object is:

```
Public class Bmessage implements serializable{
  Int intentflag;
Weakreference<context> mContextReference;
String my componentname;
Boolean issettimeout=true;
Int mtimeout=0;
Actiontype mactiontype=actiontype.service;
String   mactionname;
Boolean ishaveglobalinterceptor=false;
Map<string,object> mparams=new hashmap<>( );
Map<string,string> mheaders=new hashmap<>( );
Weakreference<activity> autocancel0nactivitydestroy;
Weakreference<fragment> autocancel0n fragment destroy;
String Mmessageid;
Callback mcallback;
Bmessage(string componentName){this. mcomponentName=componentName;}
}
```

For example, the message builder includes following methods:

obtainBuilder(String componentName): In this method, the component name (ComponentName) is filled in, and it is needed to fill in the component name at the first time the message object is constructed.

setContext(Context context): This method is to call the setContext( ) method when constructing the generic message, and the context (Context) needs to be input.

setActionType(ActionType actionType): This method is used to set the message type (or the type of operation, including three types: page (PAGE), service (Service) and custom message (CUSTOM)).

setActionName(String actionName): This method is used to set a string identifier of an operation to be performed. The string identifier here corresponds to values filled in the @Page and @Service annotations, that is, the identifier of the target component.

setTimeOut(int timeOut): This method is used to set the expiration timing.

setFlag(int intentFlag): This method is used to distinguish a page jump mode for the routing module.

addParam(String key, @NonNull Object value): In this method, the key is of a String type, and the value is of an Object type, which is used for parameter transmission through messages, and the value cannot be empty. And when another setParams( ) method is used, parameters added using this method will be cleared.

setParams(Map<String, Object>params): This method is used to set a parameter set of a Map type.

setCallback(Callback callback): This method is used to set a callback. When the result is required to be returned, this callback is set.

setAutoCancelOnActivityDestroy(Activity activity): This method is used to indicate whether to perform life cycle binding with the Activity, and input Activity to be bound, which may not be set by default.

setAutoCancelOnFragmentDestroy(Fragment fragment): This method is used to indicate whether to perform life cycle binding with the Fragment, and input Fragment to be bound, which may not be set by default.

build( ): This method is used to build the message object. Calling this method means to start building the message object.

In S201, the electronic device locates the second component according to an address corresponding to the identifier of the second component in the routing information, and executes the target task to obtain a response result. The response result includes the identifier of the first component.

In some examples, the response result may also be a generic message object built by the above-mentioned message builder.

In S202, the electronic device calls back the response result to the first component according to the address corresponding to the identifier of the first component in the routing information.

The electronic device may send the response result to the first component in a reverse direction according to the route of the call request.

The foregoing mainly introduces the solutions provided by the embodiments of the present disclosure from perspective of method. In order to achieve the above functions, the solutions includes corresponding hardware structures and/or software modules for performing various functions. A person skilled in the art will be easy to realize that by combining units and algorithm steps of the examples described in the embodiments disclosed herein, the solutions of the present disclosure can be implemented through hardware or a combination of hardware and computer software. Whether a certain function is performed through the hardware or the computer software-driven hardware depends on the specific application and restrictive conditions on design of the technical solution. A skilled person may use different methods for each specific application to implement the described functions, but such implementation should not be considered beyond the scope of the present disclosure.

Functional modules of the electronic device may be divided based on the above method examples in the embodiments of the present disclosure. For example, each function module may be divided according to its function, or two or more functions may be integrated into a single processing module. The integrated module mentioned above may be implemented in a form of hardware or a functional module of software. It will be noted that the division of the functional modules in embodiments of the present disclosure is schematic, which is only a logical functional division, and there may be other manners to divide the functional modules in actual implementation.

Figure 7:
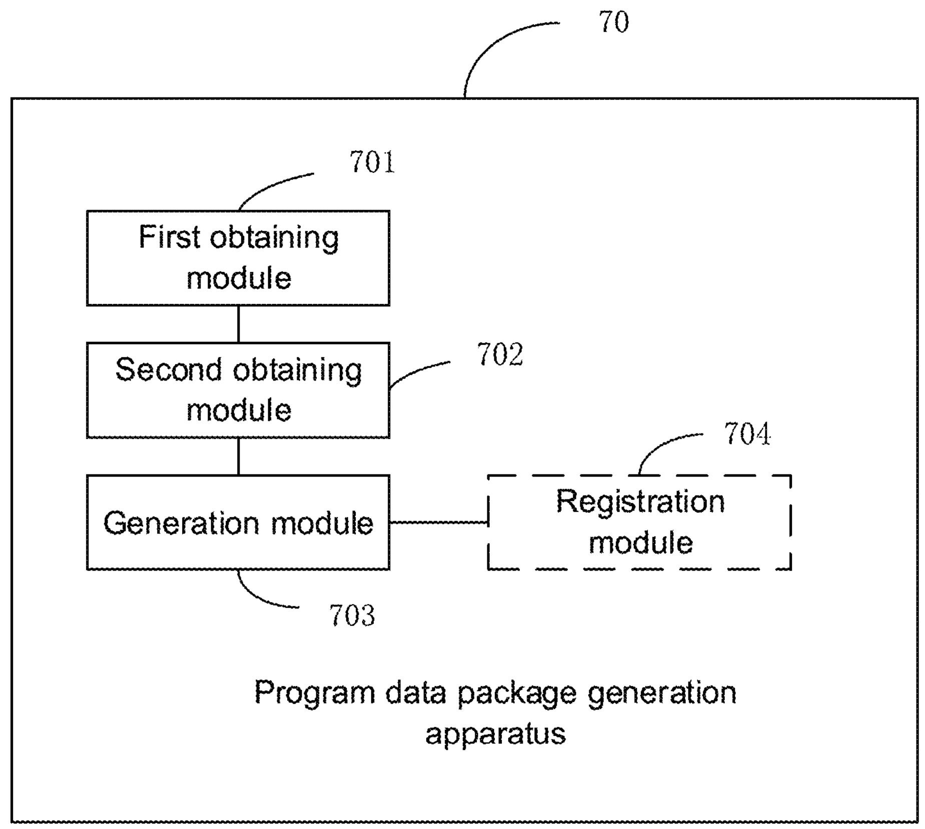
FIG. 7 is a structural diagram of a program data package generation apparatus, in accordance with some embodiments.

FIG. 7 is a structure diagram of a program data package generation apparatus provided by embodiments of the present disclosure. The program data package generation apparatus 70 includes a first obtaining module 701, a second obtaining module 702, and a generation module 703. The first obtaining module 701 is used to obtain configuration information of a target application program. The configuration information includes an identifier of a platform to which the target application program is applicable. The second obtaining module 702 is used to obtain data package(s) of target component(s) in the target application program according to the configuration information. Each target component is adapted to the platform. The generation module 703 is used to call a preset automated construction script, and generate the data package of the target application program according to the configuration information and the data package of the target component. For example, with reference to FIG. 2, the first obtaining module 701 may be used to perform S100, the second obtaining module 702 may be used to perform S101, and the generation module 703 may be used to perform S102.

In some examples, the second obtaining module 702 is used to: determine candidate components corresponding to the configuration information, the candidate components being adapted to the platform; use an identifier of at least one candidate component of the candidate components corresponding to the first preset operation as the identifier of the target component in response to a first preset operation on the at least one candidate component; and obtain the data package of the target component according to the identifier of the target component.

In some examples, the above-mentioned configuration information includes a placeholder and a value corresponding to the placeholder. A data package of at least one target component includes the placeholder. The generation module 703 is used to: call the preset automated construction script to obtain a type of the target component, and determine the positions of different types of target components in the data package of the target application program according to the configuration information and the type of the target component; and replace the placeholder in the data package of the at least one target component with the value corresponding to the placeholder according to the configuration information to obtain the data package of the target application program.

In some examples, the first obtaining module 701 is used to: display a configuration page in response to a trigger operation for generating the application program data package, the configuration page including an input control for the placeholder and an input control for a platform parameter; obtain information corresponding to the placeholders in response to a second preset operation on the input control for the placeholder in the configuration page, and use the information corresponding to the placeholder as the value of the placeholder; and obtain information corresponding to the platform parameter, and use the information corresponding to the platform parameter as the identifier of the platform in response to a third preset operation on the input control for the platform parameter in the configuration page.

In some examples, the program data package generation apparatus further includes: a registration module 704, which is used to obtain an identifier of each target component based on a preset plug-in, and register each target component based on the identifier of each target component.

In some examples, the target application program includes the first component and the second component. Both the first component and the second component inherit from a same parent class. The first component calls the second component through a call request to perform a target task. The call request includes an identifier of the first component and an identifier of the second component. The target application program includes routing information between components. The routing information between components includes a first relationship and a second relationship. The first relationship is a corresponding relationship between the identifier of the first component and an address of the first component. The second relationship is a corresponding relationship between the identifier of the second component and an address of the second component, and the second relationship is used to locate the call request to the second component to perform the target task. The first relationship is used to call back an execution result of the target task to the first component.

In some examples, the above-mentioned call request includes a generic message object. The generic message object includes the identifier of the second component. The general message object is obtained according to a message builder.

In an example, referring to FIG. 1A, receiving functions of the first obtaining module 701 and the second obtaining module 702 mentioned above may be implemented by the interface unit 104 in FIG. 1A. A processing function of the first obtaining module 701, a processing function of the second obtaining module 702, the generation module 703, and the registration module 704 may be implemented by the processor 101 in FIG. 1A by calling computer programs stored in the memory 102.

As for specific description of the foregoing optional manners, reference may be made to the foregoing method embodiments, which will not be repeated here. In addition, for the explanation and the description of the beneficial effects of any program data package generation apparatus 70 provided above, reference may be made to the corresponding method embodiment described above, and details will not be repeated here.

It will be noted that actions corresponding to each module above are only specific examples, and the actions actually performed by each unit may be referred to the actions or steps mentioned in the above description of the embodiments described based on FIG. 2 and FIG. 6.

Some embodiments of the present disclosure provide a computer-readable storage medium (e.g., a non-transitory computer-readable storage medium). The computer-readable storage medium has stored therein computer program instructions that, when run on a processor, cause the processor to perform one or more steps of the program data package generation method as described in any of the above embodiments.

For example, the computer-readable storage medium includes but is not limited to, a magnetic storage device (e.g., a hard disk, a floppy disk or a magnetic tape), an optical disk (e.g., a compact disk (CD), a digital versatile disk (DVD)), a smart card, a flash memory device (e.g., an erasable programmable read-only memory (EPROM)), a card, a stick or a key driver. Various computer-readable storage media described in the present disclosure may refer to one or more devices for storing information and/or other machine-readable storage medium. The term "machine-readable storage medium" may include, but is not limited to, wireless channels and other various media capable of storing, containing and/or carrying instructions and/or data.

Some embodiments of the present disclosure provide a computer program product. The computer program product includes computer program instructions. When executed on a computer, the computer program instructions cause the computer to perform one or more steps of the program data package generation method as described in the above embodiments.

Some embodiments of the present disclosure provide a computer program. When the computer program is executed on the computer, the computer program causes the computer to perform one or more steps of the program data package generation method as described in the above embodiments.

Beneficial effects of the computer-readable storage medium, the computer program product and the computer program are the same as the beneficial effects of the program data package generation method as described in some of the above embodiments, which will not be described herein again.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A program data package generation method applied to an electronic device, the method comprising:

obtaining, by the electronic device, configuration information of a target application program, the configuration information including an identifier of an application platform to which the target application program is applicable;

obtaining, by the electronic device, a data package of at least one target component in the target application program according to the configuration information, the at least one target component being adapted to the application platform;

calling, by the electronic device, a preset automated construction script, and generating a data package of the target application program according to the configuration information and the data package of the at least one target component;

obtaining, by the electronic device, an identifier of the at least one target component based on a preset plug-in; and registering, by the electronic device, the at least one target component based on the identifier of the at least one target component;

wherein the electronic device stores a corresponding relationship between the identifier of the at least one target component and the data package of the at least one target component;

the at least one target component includes a first component and a second component; both the first component and the second component inherit from a same parent class;

the method further comprising:

generating, by the electronic device, routing information between components in the target application program according to the identifier of the at least one target component; the routing information between components includes a first relationship and a second relationship; the first relationship is a corresponding relationship between the identifier of the first component and an address of the first component; the second relationship is a corresponding relationship between the identifier of the second component and an address of the second component;

generating, by the electronic device, a call request in the first component to call the second component to perform a target task in response to a target instruction; wherein the call request includes an identifier of the first component and an identifier of the second component;

locating, by the electronic device, the call request to the second component to perform the target task according to the second relationship; and calling back, by the electronic device, an execution result of the target task to the first component according to the first relationship.

2. The method according to claim 1, wherein obtaining the data packages of the at least one target component in the target application program according to the configuration information includes:

determining candidate components corresponding to the configuration information, the candidate components being adapted to the application platform;

in response to a first preset operation on at least one candidate component of the candidate components, using an identifier of the at least one candidate component corresponding to the first preset operation as an identifier of the at least one target component; and obtaining the data package of the at least one target component according to the identifier of the at least one target component.

3. The method according to claim 1, wherein the configuration information further includes a placeholder and a value corresponding to the placeholder, and the data package of the at least one target component in the target application program includes the placeholder; calling the preset automated construction script, and generating the data package of the target application program according to the configuration information and the data package of the at least one target component includes:

calling the preset automated construction script to obtain a type of the at least one target component;

determining positions of different types of target components in the data package of the target application program according to the configuration information and the type of the at least one target component; and replacing the placeholder in the data package of the at least one target component with the value corresponding to the placeholder according to the configuration information to obtain the data package of the target application program.

4. The method according to claim 3, wherein obtaining the configuration information of the target application program includes:

displaying a configuration page in response to a trigger operation for generating the data package of the target application program, the configuration page including an input control for the placeholder and an input control for an application platform parameter;

obtaining information corresponding to the placeholder in response to a second preset operation on the input control for the placeholder in the configuration page, and using the information corresponding to the placeholder as the value of the placeholder; and obtaining information corresponding to the application platform parameter in response to a third preset operation on the input control for the application platform parameter in the configuration page, and using the information corresponding to the application platform parameter as the identifier of the application platform.

5. The method according to claim 1, wherein the call request further includes a generic message object; the generic message object includes the identifier of the second component; and the generic message object is obtained according to a message builder.

6. An electronic device, comprising:

a processor; and a memory configured to store instructions capable of being executed by the processor, wherein the processor is configured to execute the instructions to implement a program data package generation method applied to the electronic device, the method includes:

obtaining, by the electronic device, configuration information of a target application program, the configuration information including an identifier of a application platform to which the target application program is applicable;

obtaining, by the electronic device, a data package of at least one target component in the target application program according to the configuration information, the at least one target component being adapted to the application platform;

calling, by the electronic device, a preset automated construction script, and generating a data package of the target application program according to the configuration information and the data package of the at least one target component;

obtaining, by the electronic device, an identifier of the at least one target component based on a preset plug-in; and registering, by the electronic device, the at least one target component based on the identifier of the at least one target component;

wherein the electronic device stores a corresponding relationship between the identifier of the at least one target component and the data package of the at least one target component;

the at least one target component includes a first component and a second component; both the first component and the second component inherit from a same parent class;

the method further includes:

generating, by the electronic device, routing information between components in the target application program according to the identifier of the at least one target component; the routing information between components includes a first relationship and a second relationship; the first relationship is a corresponding relationship between the identifier of the first component and an address of the first component; the second relationship is a corresponding relationship between the identifier of the second component and an address of the second component;

generating, by the electronic device, a call request in the first component to call the second component to perform a target task in response to a target instruction; wherein the call request includes an identifier of the first component and an identifier of the second component;

locating, by the electronic device, the call request to the second component to perform the target task according to the second relationship; and calling back, by the electronic device, an execution result of the target task to the first component according to the first relationship.

7. The electronic device according to claim 6, wherein obtaining the data package of the at least one target component of the target application program according to the configuration information includes:

determining candidate components corresponding to the configuration information, the candidate components being adapted to the application platform;

in response to a first preset operation on at least one candidate component of the candidate components, using an identifier of the at least one candidate component corresponding to the first preset operation as an identifier of the at least one target component; and obtaining the data package of the at least one target component according to the identifier of the at least one target component.

8. The electronic device according to claim 6, wherein the configuration information further includes a placeholder and a value corresponding to the placeholder, and the data package of the at least one target component in the target application program includes the placeholder; calling the preset automated construction script, and generating the data package of the target application program according to the configuration information and the data package of the at least one target component includes:

calling the preset automated construction script to obtain a type of the at least one target component;

determining positions of different types of target components in the data package of the target application program according to the configuration information and the type of the at least one target component; and replacing the placeholder in the data package of the at least one target component with the value corresponding to the placeholder according to the configuration information to obtain the data package of the target application program.

9. The electronic device according to claim 8, wherein obtaining the configuration information of the target application program includes:

displaying a configuration page in response to a trigger operation for generating the data package of the target application program, the configuration page including an input control for the placeholder and an input control for an application platform parameter;

obtaining information corresponding to the placeholder in response to a second preset operation on the input control for the placeholder in the configuration page, and using the information corresponding to the placeholder as the value of the placeholder; and obtaining information corresponding to the application platform parameter in response to a third preset operation on the input control for the application platform parameter in the configuration page, and using the information corresponding to the application platform parameter as the identifier of the application platform.

10. The electronic device according to claim 6, wherein the call request further includes a generic message object; the generic message object includes the identifier of the second component; and the generic message object is obtained according to a message builder.

11. A non-transitory computer-readable storage medium comprising instructions that, when executed by a processor of an electronic device, cause the processor to perform the program data package generation method according to claim 1.

12. A computer program product embodied on a non-transitory computer-readable medium, the computer program product comprising computer program instructions that, when run on a computer, cause the computer to perform the program data package generation method according to claim 1.

* * * * *